(12) United States Patent
Bernard et al.

(10) Patent No.: US 6,220,535 B1
(45) Date of Patent: Apr. 24, 2001

(54) SYSTEM FOR THE IN-SITU PREPARATION OF CRUDITES FROM WHOLE VEGETABLE OR VEGETABLES IN PIECES

(75) Inventors: Fombreteau Bernard, Aubusson; Descomps Xavier, Felletin; Roussat Bruno, Saint Amand, all of (FR)

(73) Assignee: Dito Sama, Aubusson (FR)

( * ) Notice: Subject to any disclaimer, the term of this patent is extended or adjusted under 35 U.S.C. 154(b) by 0 days.

(21) Appl. No.: 09/433,742

(22) Filed: Nov. 4, 1999

(30) Foreign Application Priority Data

Nov. 5, 1998 (FR) .................................................. 98 13943

(51) Int. Cl.⁷ .................................................. A47J 43/046
(52) U.S. Cl. .............................................. 241/92; 241/100
(58) Field of Search ............................... 99/510; 366/245, 366/251; 241/100, 92, 282.1, 282.2, 285.1

(56) References Cited

U.S. PATENT DOCUMENTS

| 4,189,241 | * | 2/1980 | Baldacci | ................................ 366/245 |
| 4,386,740 | | 6/1983 | Van Deursen . | |
| 4,448,360 | | 5/1984 | Williams . | |
| 5,556,198 | * | 9/1996 | Dickson et al. . | |
| 5,875,706 | * | 3/1999 | Borger et al. | ........................... 241/92 |

FOREIGN PATENT DOCUMENTS

| 318 347 | 5/1989 | (EP) . |
| 1324653 | 7/1963 | (FR) . |

* cited by examiner

*Primary Examiner*—Mark Rosenbaum
(74) *Attorney, Agent, or Firm*—Sughrue, Mion, Zinn, Macpeak & Seas, PLLC

(57) ABSTRACT

This system is characterized in that it comprises at least one unit (2) comprising at least one area (3) for holding, and presenting to the public, containers (4) prefilled with vegetables and equipped with means for cutting them up, and at least one work station (8) constructed to hold at least one of the containers and fitted with means for driving the cutting means of the container in order to cut the vegetables up into crudités, and with means (10) for holding the resulting crudités, and in that the cutting means and the drive means comprise complementary coupling means for when the container is loaded into the work station.

14 Claims, 3 Drawing Sheets

SYSTEM FOR THE IN-SITU PREPARATION OF CRUDITES FROM WHOLE VEGETABLE OR VEGETABLES IN PIECES

The present invention relates to a system for the in-situ preparation of crudités from whole vegetables or vegetables in pieces.

It is generally known that the preparation of this type of food product raises a number of problems, especially in catering.

The problem is that food products of this type are usually prepared well before consumption and, by the time they are presented to potential consumers, their appearance and/or palatability have become poorer.

At the same time there has been a trend for some years now for consumers to demand that their products be as fresh as possible.

The object of the invention is therefore to propose a system of preparation that will solve these problems.

To this end, the subject of the invention is a system for the in-situ preparation of crudités from whole vegetables or vegetables in pieces, characterized in that it comprises at least one unit comprising:

- at least one area for holding, and presenting to the public, containers prefilled with vegetables and equipped with means for cutting them, and
- at least one work station constructed to hold at least one of the containers and fitted with means for driving the cutting means of the container in order to cut the vegetables up in the form of crudités, and with means for holding the resulting crudités, and in that the cutting means and the drive means comprise complementary coupling means for when the container is loaded into the work station.

A clearer understanding of the invention will be gained from the following description given purely by way of example and with reference to the accompanying drawings, in which:

FIG. 1 shows a system for the in-situ preparation of crudités from whole vegetables or vegetables in pieces.

Figure 1:
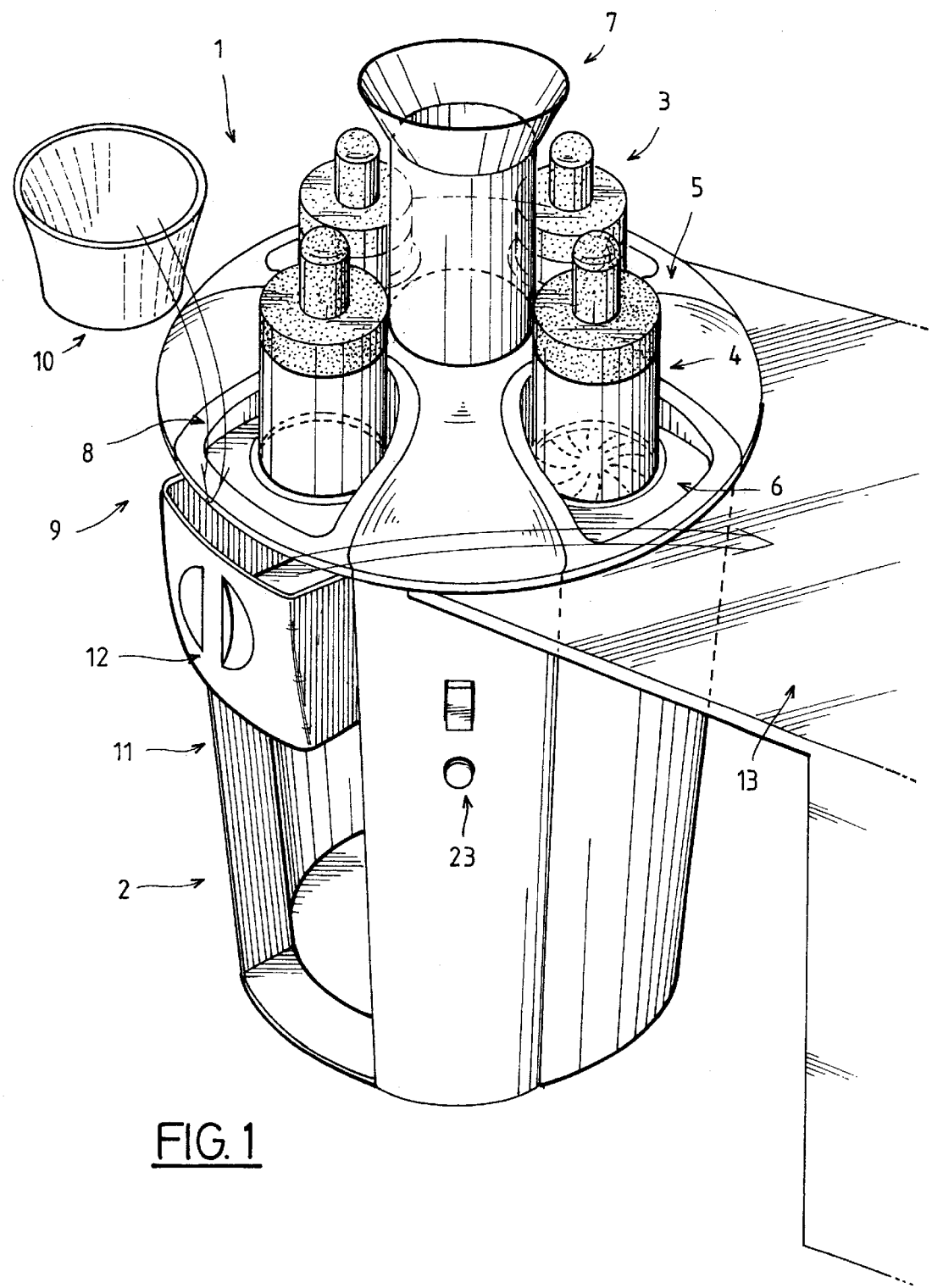
FIG. 1 is a perspective view of an example of an embodiment of a system according to the invention.

This system is denoted by the general reference 1 and comprises, for example, at least one unit denoted by the general reference 2 having various parts, among which are at least one area for holding, and presenting to the public, containers prefilled with vegetables and equipped with means for cutting them. This area for holding containers and presenting them to the public is denoted by the general reference 3.

One of the containers is denoted by the general reference 4.

In fact, this area for holding containers and presenting them to the public may for example comprise a tray denoted by the general reference 5, with recesses, for example 6, for holding the containers, for example 4.

It will be seen therefore that several containers can be arranged at regular intervals in recesses in this tray and can be presented to the public in a user-friendly way.

This area for holding prefilled vegetable containers and presenting them to the public may also comprise means for maintaining them at temperature.

These means may for example take the form of an ice holder denoted by the general reference 7 in this figure, arranged in the centre of the tray and therefore in the middle of the containers.

Other means can of course be envisaged.

The unit 2 also comprises at least one work station denoted by the general reference 8: it is constructed to hold at least one of the containers and is fitted, as will be described below in more detail, with drive means for the cutting means with which the containers are fitted, in order to cut the vegetables up into crudités.

In addition, this work station 8 comprises holding means for the resulting crudités, denoted by the general reference 9 in this FIG. 1.

In practice, these crudités holding means may for example comprise, as is conventional, a receptacle in the form of a salad bowl for example, denoted by the general reference 10, designed to be placed in a corresponding housing 11 in the unit 2 underneath the work station 8, this housing being for example equipped with a drawer denoted by the general reference 12 and designed to hold the salad bowl receptacle 10.

Lastly, the unit 2 may also comprise an area for presenting the crudités to the public, this area being denoted by the general reference 13 in this FIG. 1 and taking the general form of for example a table or the like.

Figure 2:
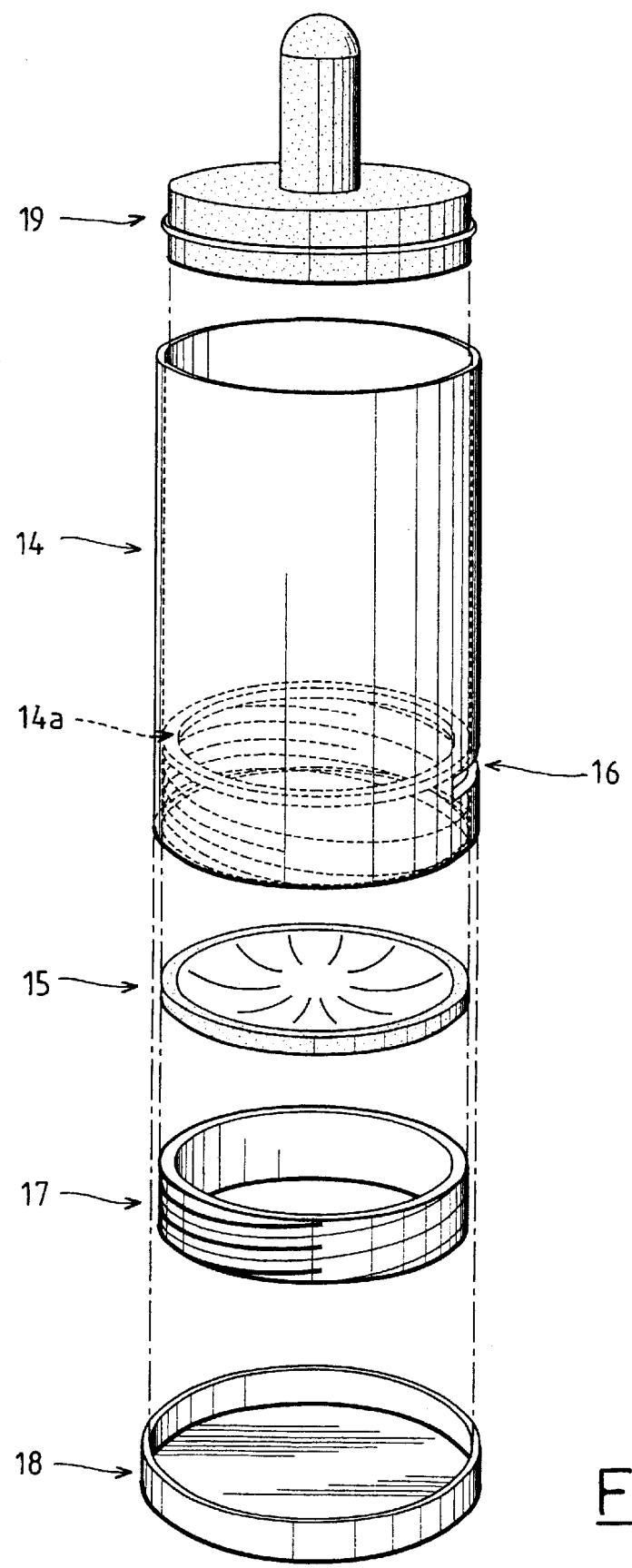
FIG. 2 is an exploded perspective view of an example of an embodiment of a container belonging to such a system.

An example of an embodiment of a container is shown in more detail in FIG. 2.

This container is denoted by the general reference 14 in this FIG. 2 and comprises, for example, a body made at least partly from a transparent material to allow the public to see the whole vegetables or pieces of vegetables contained inside it.

This container may therefore contain e.g. carrots, cabbage, cucumber, tomatoes, mushrooms, celery or the like.

At its lower end the container 14 is equipped with cutting means denoted by the general reference 15. They take the form of, for example, a disc having cutting blades appropriate for the crudités which it is wished to obtain.

These cutting means 15 are then mounted rotatably in the bottom of the container, e.g. alongside a slot 16 formed in the container wall, and are held in their axial position between a collar 14a on the inside of the container and a fastening member denoted by the general reference 17, the outer face of which has for example locking means which lock onto complementary locking means on the inside of the container.

A cap denoted by the general reference 18 may also be provided at this end of the container to preserve the vegetables contained in the container, e.g. when it is placed on the tray.

At its other end, that is to say its upper end in the example described, the container comprises a stopper forming a plunger denoted by the general reference 19.

It will be seen therefore that a variety of different containers of this kind are first filled by an operator and then arranged in the various recesses on the tray of the area where these containers are held and presented to the public.

When crudités are to be prepared, a salad bowl 10 is placed in the corresponding housing 11 of the unit 2 and more particularly in the drawer 12 underneath the work station of the unit.

The container containing the corresponding vegetables is then moved into the work station 8 without its cap 18, so that coupling means complementary to the cutting means 15 and drive means of this work station can engage so that the crudités can be cut up.

The crudités then fall into the salad bowl 10, which, when the operation of preparing the crudités has finished, can be withdrawn from the corresponding drawer 12 and placed in the area 13 for presentation of the crudités to the public.

It can be seen therefore that the stopper forming the plunger 19 of each container allows the operator to press the vegetables against the cutting means during the preparation of the crudités.

As indicated earlier, each container 14 includes, for example, a slot 16 alongside its cutting means 15.

This slot 16 enables, for example, coupling of these cutting means 15 with complementary coupling means belonging to the drive means located inside the work station 8.

These coupling means therefore may comprise, for example, friction coupling means, and the drive means of the cutting means may comprise for example an electric motor provided with means of controlling its operation, as is conventional.

Such a motor therefore drives e.g. a friction disc which engages with a corresponding friction drive track on the edge of the cutting means 15 in order to rotate the latter inside the container and cut the vegetables.

Figure 3:
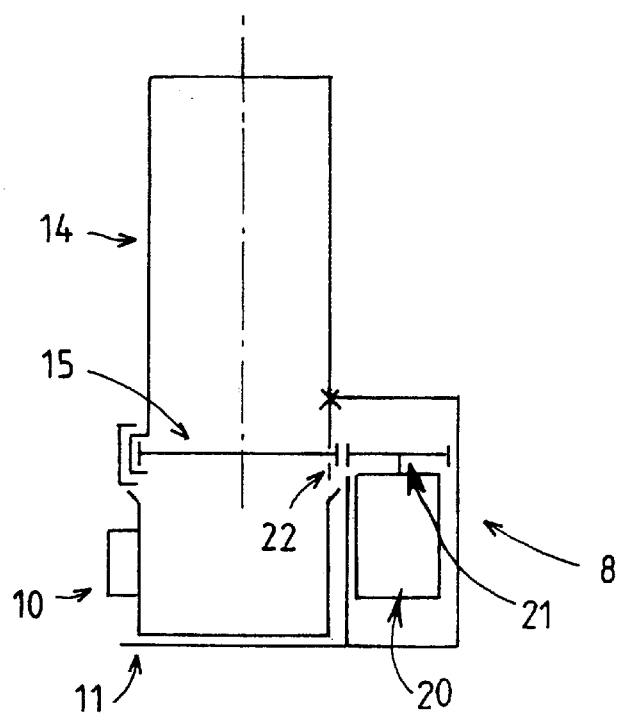

This is illustrated in FIG. 3, in which the container 14, the salad bowl 10, the housing 11 for holding this salad bowl and the cutting means 15 in the bottom of the container 14 can be recognized.

As indicated earlier, the drive means located inside the work station 8 comprise, for example, an electric motor denoted by the general reference 20 in this figure and connected to a friction drive disc 21 engaging with a friction track e.g. 22 on the cutting means.

It can be seen therefore that the containers can be engaged by hand in the work station by an operator.

To do this the operator takes one of the containers from the area where they are held and presented to the public and removes it from the corresponding tray, and more particularly from the corresponding recess thereof.

He then places this container by hand in the work station in order to couple the container's cutting means to the drive means of the work station.

He can then start the electric motor 20 by means of e.g. control buttons 23 (FIG. 1) mounted on the unit 2.

In another embodiment, the tray can be moved relative to the work station 8 to position one of the containers carried by it in this work station.

This tray can then be moved by hand by an operator or by motorized means using drive means controllable by the operator.

Figure 4:
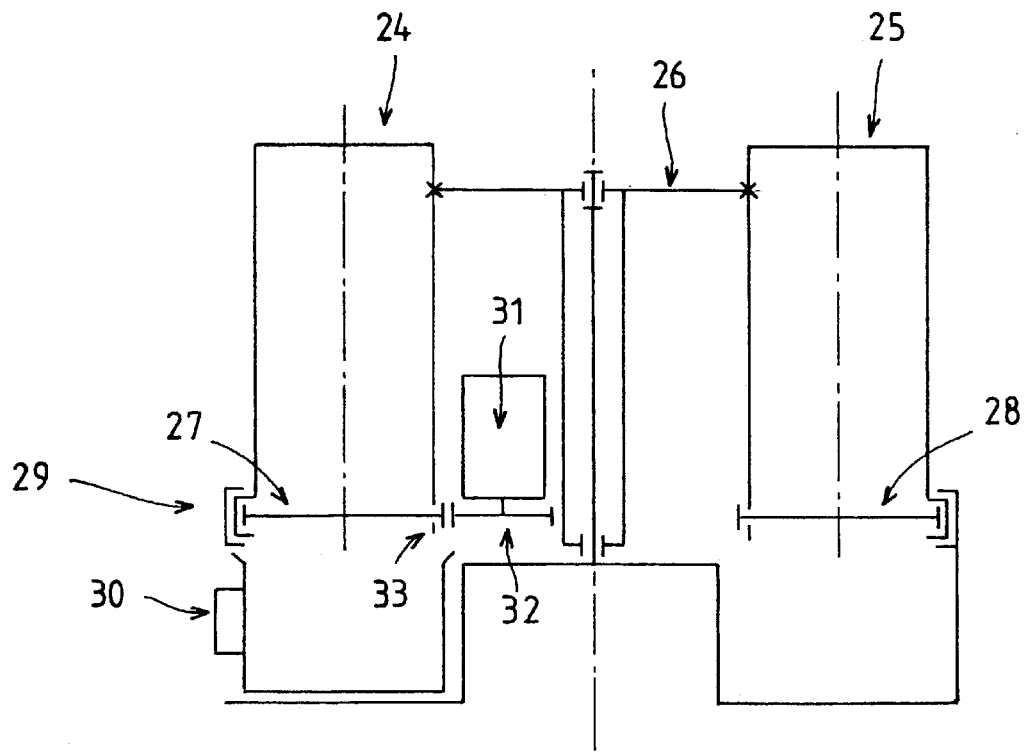
FIGS. 3 and 4 show two possible examples of embodiments of a work station belonging to such a system.

In the example of an embodiment illustrated in FIG. 4, the tray can be moved rotationally and in that case takes the form of a drum for positioning one of the containers in the work station. Hence this figure shows, for example two containers denoted by the general references 24 and 25, supported by a tray 26 mounted rotatably relative to the rest of the frame of the unit.

Each container is equipped with cutting means 27 and 28, for example, and the tray 26 can be moved rotationally to position one of the containers in the work station, which has the general reference 29 in this figure, and underneath which is a salad bowl 30 for holding the crudités.

This work station also includes an electric motor 31 connected to a friction drive disc 32 designed to engage with a complementary friction track 33 on the cutting means, for example 27, of the container 24.

It can be seen therefore that in this case the tray can be moved rotationally to position one of the containers in the work station and couple its cutting means to the drive means.

It goes without saying of course that still other embodiments of such a system can be envisaged.

For example, the tray may be stationary while the work station moves around it until it reaches the selected container.

It can be seen therefore that such a system makes it possible to prepare crudités in situ from whole vegetables or vegetables in pieces, directly in front of the potential consumers, thereby guaranteeing their freshness.

What is claimed is:

1. A system for the in-situ preparation of crudités from whole vegetables or vegetables in pieces, characterized in that it comprises at least one unit (2) comprising:

at least one area (3) for holding, and presenting to the public, containers prefilled with vegetables (4; 14, 24, 25) and equipped with means (15; 27, 28) for cutting the vegetables, at least one work station (8; 29) constructed to hold at least one of the containers and fitted with means (20; 31) for driving the cutting means of the at least one container in order to cut the vegetables up in the form of crudités, and with means (10; 30) for holding the resulting crudités, and complementary coupling means (21, 22; 32, 33) for coupling the cutting means and the driving means when the container is loaded into the at least one work station.

2. System according to claim 1, characterized in that the at least one unit (2) comprises at least one area (13) for presenting the crudités to the public.

3. System according to claim 1, characterized in that the containers are made at least partly from a transparent material.

4. System according to claim 1, characterized in that the containers comprise a stopper forming a plunger (19).

5. The system according to claim 1, characterized in that the crudités holding means (10; 30) is placed in a housing (11) in the at least one unit (2) underneath the at least one work station (8; 29).

6. System according to claim 1, characterized in that the at least one area (3) for holding prefilled vegetable containers and presenting them to the public comprises means (7) for maintaining them at temperature.

7. System according to claim 6, characterized in that the maintaining means comprises an ice holder.

8. System according to claim 1, characterized in that the at least one area (3) for holding the containers and presenting them to the public comprises a tray (5) with recesses (6) for carrying these containers.

9. System according to claim 8, characterized in that the tray can be moved relative to the work station to position one of the containers carried by the tray in this work station.

10. System according to claim 9, characterized in that the tray can be moved by hand by an operator.

11. The system according to claim 1, characterized in that the containers can be moved by hand by an operator between the area (3), for holding and presenting the containers to the public, and the work station.

12. System according to claim 10, characterized in that the tray can be moved rotationally.

13. The system according to claim 1, characterized in that the driving means for the cutting means includes an electric motor (20; 31) provided with means for controlling the motor's operation (23).

14. System according to claim 1, characterized in that the complementary means for coupling the cutting means and the driving means comprise friction coupling means.

* * * * *